UNITED STATES PATENT OFFICE.

ADAM DIXON WARNER, OF LOS ANGELES, CALIFORNIA.

FOOD COMPOUND.

1,018,462. Specification of Letters Patent. Patented Feb. 27, 1912.

No Drawing. Application filed June 14, 1911. Serial No. 633,139.

*To all whom it may concern:*

Be it known that I, ADAM DIXON WARNER, a citizen of the United States, residing at Los Angeles, in the county of Los Angeles and State of California, have invented new and useful Improvements in Food Compounds, of which the following is a specification.

My invention and discovery relates to food compounds.

The object of my invention is to produce a palatable, easily digestible, nutritious food compound in which the nutrient properties of legumes, fruits, cereals, vegetables and nuts are combined and blended, and properly balanced to produce the highest degree of nourishing efficiency with a minimum of waste or inefficient ingredient. A further object thereof is to produce a blended compound in which the ingredients are prepared to aid the digestive process and to avoid fermentation and the formation of gas or toxic poisoning which disease the alimentary canal and the whole human organism; and a still further object thereof is to produce a compound in convenient form for immediate use or preservation, containing in proper proportions a coagulated partially dextrinized mass of protein, carbohydrates, ash, and fat properties of legumes, lentils, cereals, fruits and nuts that produce heat and muscular power—forms of force and energy.

Another object of my invention is to produce a simple and efficient process for preparing and intermingling said ingredients for a convenient marketable product, to be digested without difficulty, and to produce its assimilation into nourishment to supply the demands of the human body.

To these ends my invention comprises the combinations of component ingredients and process of preparation to be hereinafter described and more particularly pointed out in the claims.

My compound comprises, generally, a quantity of legumes, such as beans, peas, etc., which are rich in protein properties. Either or all of said legumes may be employed as preferred. These ingredients are prepared as hereinafter described and have commingled therewith fruits and cereals such as raisins, figs, prunes, currants, apricots and pears, etc., crushed whole wheat, corn and rice to provide the elements of carbo-hydrates, ash and heat; raisins, figs, prunes, currants, pears, apricots, or apples, or either of them, to supply the desired sugar; and nuts to provide fats, with the whole of oranges, grape-fruit or olives to supply fruit-oils containing peptones and quinine—which is contained in the skin and pulp of the oranges and grape-fruit—and flavorings of onions, parsley, celery, dandelions or chives, etc., to suit the taste.

In the preparation of my food compound, legumes such as beans, peas or other plant products which are rich in protein properties are soaked in two changes of water for approximately one hour each and thereafter boiled in a sufficient quantity of water for approximately six hours and then steam-dried from three to four hours at about 220° Fahr., thereby extracting the excessive crude fiber from the coating thereof which is likely to cause flatulency, and reducing the same to a digestible, amalgamated, coagulated mass. The meal of the whole grain of wheat, rye, corn, rice or oats, which has been previously thoroughly steam cooked, is added in the desired quantity to reduce the mass to the preferred consistency, and flavorings of onions, parsley or celery may be used in small quantity to suit the taste. For the purpose of combining the element of fats, almonds, walnuts, peanuts and olive oil, or either of them, may be thoroughly pulverized and commingled therewith. Raisins and figs, the former being seeded, and both uncooked, are thoroughly macerated and combined with pears, currants, apricots, prunes and apples, or either of them as preferred, containing natural fruit sugars, are now added to the mass to act and operate as a preservative, and to enrich and enliven the liver, kidneys and spleen, and by their interaction with the legumes, cereals and nuts a new unitary result is obtained that is a true combination involving novelty, utility, discovery and invention. To the basic compound thus described, I make the addition of an extract from oranges, grape-fruit and olives, which are thoroughly macerated and boiled for approximately ninety minutes, and thereafter strained to obtain only the oils, essence and juices without the pulpy refuse, which product contributes peptones and quinine to strengthen the digestion and prevent malaria. The compound thus described having been thoroughly intermingled may now be pressed into cakes or forms and subjected to a dry heat at about 200° Fahr. until properly dried, which action tends to more thoroughly commingle the elements of the composition, and reduces the product to a compact form ready for immediate use by school childern, soldiers, sailors, miners, cattle-herders, toilers, explorers, tourists, travelers, automobilists and aeronauts.

I will now describe the proportions of the several ingredients employed in my amalgamated food-compound to obtain the preferred balance of nutritive properties.

The leguminous and cereal elements, about equal in weight, contribute the protein properties which produce blood, bone, tissue, glands, nerves, and muscle, preferably comprise approximately fifty per cent. in weight of the whole;—while the fruits containing fruit sugars that are transformed into fats comprise about thirty-five per cent. and the nuts and lentils containing fats and high calories of heat comprise about ten per cent. of the compound, the flavorings and citrus fruit extracts above described containing high degrees of ash that produce phosphates, lime, etc., approximately five per cent. of the whole. It will of course be understood that the proportions stated may be modified as the necessities of tastes and flavorings demand without departing from the scope of the invention, in preparing the different breakfast food in solvent lunches, desserts, soups, macaroons, breads, cakes, etc., to meet the demands and necessities of use.

From the foregoing it will be apparent that the food-compound contains all the essential ingredients and elements in blended and balanced proportions for the nourishment of the human body with the minimum of refuse and fermentative ingredients, prepared in such manner to be preserved without deterioration and readily digested and assimilated into the elements of the body.

Having thus described my invention, what I claim as new and desire to be secured by Letters Patent, is—

1. A food composition adapted for immediate eating comprising a dried mass of legumes, lentils, cereals, fruits and nuts, previously macerated, and intimately commingled, substantially as described.

2. A self preserving food composition adapted for immediate eating comprising an amalgamated dried mass of cooked legumes, lentils and cereals, uncooked fruits containing sugars, the extract of boiled citrus fruits, macerated nuts, intimately commingled and evaporated, put up in liquid form in air-tight packages, or compressed into a solid form, substantially as described.

3. A self-preserving food composition adapted for immediate eating comprising an amalgamated mass of legumes, lentils and cereals, which have been separately cooked at a boiling temperature, and thereafter commingled, uncooked fruits, the extract of boiled and strained whole citrus fruits, macerated nuts, intimately commingled and evaporated at a temperature of approximately 200° Fahr. and compressed into a compact form, substantially as described.

ADAM DIXON WARNER.

Witnesses:
ALBERT WARD,
R. H. YOUNG.

Copies of this patent may be obtained for five cents each, by addressing the "Commissioner of Patents, Washington, D. C."